April 14, 1953 F. L. McINTIRE ET AL 2,635,073
PHENOL REMOVAL FROM PHENOL-CONTAMINATED AMMONIA LIQUORS
Filed June 8, 1949
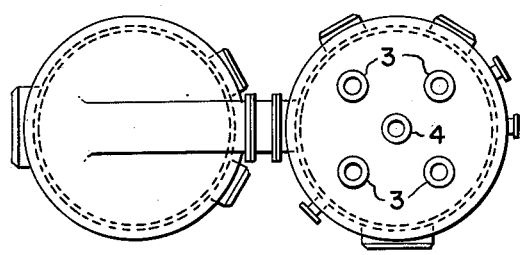
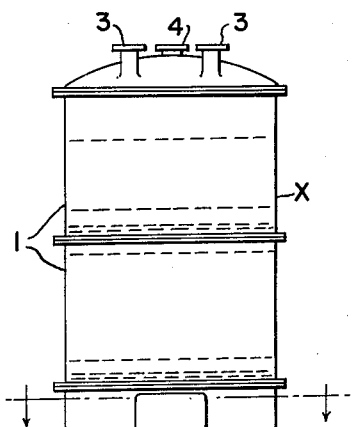
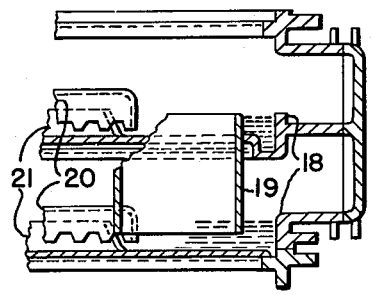
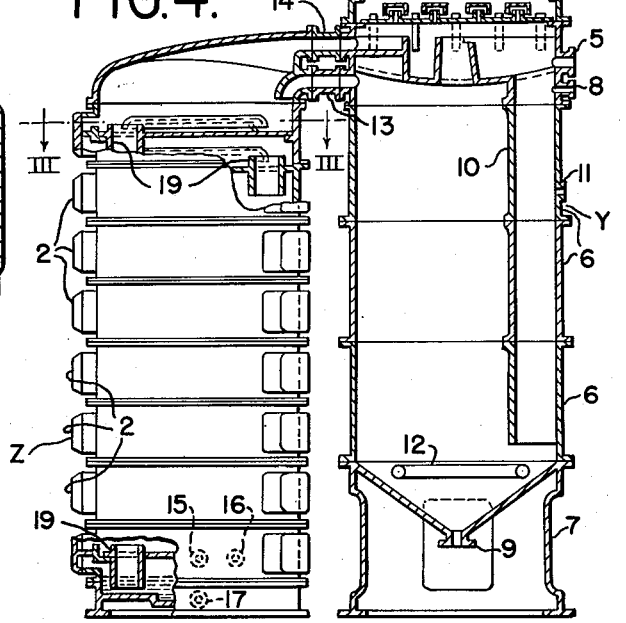
INVENTORS
FORREST L. MC INTIRE
AND DAN P. MANKA
BY
*J. R. Harris*
ATTORNEY Patented Apr. 14, 1953

2,635,073

UNITED STATES PATENT OFFICE 2,635,073

PHENOL REMOVAL FROM PHENOL-CONTAMINATED AMMONIA LIQUORS

Forrest L. McIntire, Brentwood, and Dan P. Manka, Pittsburgh, Pa., assignors to Jones & Laughlin Steel Corporation, Pittsburgh, Pa., a corporation of Pennsylvania Application June 8, 1949, Serial No. 97,756

6 Claims. (Cl. 202—46)

This invention relates to the purification of phenol-contaminated liquors and is particularly concerned with the purification of waste ammonia still liquor from by-product coke plants and the like.

The waste ammonia liquor obtained in the by-product coking of coal contains organic matter which imparts an offensive taste and odor to water courses into which it may be discharged. Phenol compounds are particularly objectionable in this respect even when present in very low concentrations. A number of methods for purifying such phenol-contaminated liquor has been tried, such as chemical oxidation of phenols with manganese, chromium, and their compounds, biological conversion of the phenols into innocuous forms by bacterial microorganisms, and disintegration of the phenols by electrolytic treatment. None of these methods has proved entirely satisfactory, however. Chemical oxidation converts the phenols into oxidation products which may tend to poison water courses into which they are carried. Bacterial treatment is slow and requires settling basins or the like of rather large area if any considerable quantity of liquor is to be treated. Electrolytic treatment requires expensive apparatus.

It is an object, therefore, of our invention to provide a process of phenol removal which is effective, cheap and non-poisonous. Another object is to provide such a process adapted to incorporation into existing by-product coke plant operations and apparatus. Other objects will appear from the description and explanation of our invention.

In by-product coke plants the gases distilled from coal are condensed in the collecting mains and primary coolers. About 30% of this condensate is ammonia liquor, so called, containing a little over 1% of ammonia. This ammonia liquor is separated from the tar, and its ammonia is recovered by steam distillation in ammonia stills. The effluent from the stills, which must be disposed of, is called waste ammonia liquor or waste ammonia still liquor. The distillation does not remove any of the phenols, although, because of the dilution of the liquor by condensed steam, the relative phenol content is lessened. It is common practice to operate a phenol recovery system in connection with the ammonia stills, and when this is done, the phenol content of the liquor is reduced from a value of perhaps 3,000 parts per million at the ammonia still inlet to a figure generally not less than 150 to 200 p. p. m. in the waste ammonia still liquor. Such phenol contents are well above the levels producing the undesirable conditions previously mentioned when the waste liquor is discharged into water courses. The operation of phenol recovery systems to take out more phenols than are represented by these figures is not economical, if practical at all.

We have invented a process by which the phenol content of waste ammonia still liquor may be reduced to low values, such as 20 p. p. m. or less. We obtain this result by introducing air or other gas containing free oxygen into the ammonia still, preferably at the bottom of the so-called fixed still, in the manner to be described. We are also able to reduce phenols effectively by introducing air at certain other points in the ammonia still. Alternatively, our process may be carried out in apparatus separate from the ammonia still if desired.

A by-product plant ammonia still modified to effect phenol removal by the process of our invention is shown in the attached drawing, to which reference is now made. In this drawing Fig. 1 represents an elevation, partly in section, of an ammonia still; Fig. 2 a plan view of the still; Fig. 3 a horizontal cross-section at the plane III—III of Fig. 1; Fig. 4 a horizontal cross-section at the plane IV—IV of Fig. 1; and Fig. 5 a typical vertical section illustrating the still construction.

The ammonia still, Fig. 1, may be seen to be made up of three principal parts. The upper section, designated broadly by the letter X, is known to those skilled in the art as the free still. The section immediately below, designated by the letter Y, is called the lime leg, and the section beside the lime leg, designated Z, is called the fixed still. The ammonia liquor enters at the top of the free still and passes through the three still sections in the order in which they have been named. Steam is admitted at the bottom of the fixed still and rises through the fixed and free stills and is withdrawn at the top of the free still.

The free still X comprises a column of metal shells of two types, 1 and 2. Shells 1 are packed with some form of column packing known to the art; the construction of shells 2 will be described in a following section. Ammonia liquor inlets 3 are provided at the top of the free still, as well as a vapor outlet 4. A liquor outlet 5 is provided at the bottom of the free still. The lime leg Y directly below the free still is made up of cylindrical shells 6 supported on a base 7 and provided with a liquor inlet 8 and a drain 9 at the bottom. A vertical partition 10 divides the interior into larger and smaller portions, the smaller being provided with an inlet 11 for the lime solution. A steam pipe 12, perforated with small holes, is located at the bottom of the lime leg, to provide steam for agitating and mixing the liquor and lime solution. An outlet pipe 13 connects the lime leg with the fixed still Z, which is composed of cylindrical shells 2 similar in construction to those of the free still. The fixed still is connected to the bottom of the free still by the pipe 14, and provided with steam inlets 15 in its lower section, air inlets 16, and a waste liquor drain 17.

The construction of the individual still sections 2 may be understood more readily by considering Figs. 3, 4 and 5 in connection with Fig. 2. Figs. 3 and 4, being cross-sections on the planes III—III and IV—IV, indicate that sections 2 of the free still and the fixed still, respectively, are essentially the same, though differently oriented. These still sections are shown in Fig. 5 to be composed of similar trays or plates 18, vertically disposed one above the other, connected by overflow pipes 19. The top of the overflow pipe 19 acts as a weir, maintaining a constant level of liquid in the plate 18. The cut-away section at the top of the fixed still Z illustrates the staggered arrangement of these overflow pipes 19 between successive trays. Each tray 18 is also equipped with bubble caps 20, which permit gases and vapors to ascend through the still but force them to bubble through the liquid contained in each successive plate. From Fig. 5 it may be seen that the bubble cap 20 is separated from and overhangs its base 21, the lower edge of the cap 20 being below the level of liquid in the plate. In the still as shown each tray is equipped with four such bubble caps but a greater or smaller number may be employed if desirable.

In operation, ammonia liquor is introduced through the inlets 3 and makes its way through the packed sections 1, into the plates of sections 2, finally reaching the bottom of the free still X. As this liquor descends, it is brought into countercurrent contact by means of the bubble caps with the ascending steam and vapors brought over from the fixed still Z. The steam causes the easily dissociated ammonia salts in the liquor to split and liberate ammonia, which rises with the steam and other vapors and is taken off through the outlet 4. The ammonia liquor at the bottom of the free still X is withdrawn through the liquor outlet 5. This outlet may be directly connected to the liquor inlet 8 of the lime leg Y, but if phenol is to be recovered from the ammonia liquor, the phenol recovery apparatus is usually connected between these points.

In the lime leg Y the ammonia liquor enters through the inlet 8 and so-called milk of lime, an aqueous slurry of lime, is introduced through the lime inlet 11. Live steam from the pipe 12 agitates the liquor and lime suspension and maintains it at boiling temperature, thus decomposing the fixed ammonia salts. From the lime leg Y the limed ammonia liquor passes through the outlet pipe 13 into the fixed still Z. Steam is introduced through steam inlets 15 at the bottom of the fixed still and passes upward under the bubble caps and through the limed ammonia liquor, distilling the ammonia from the decomposed salts in a manner similar to that of the free still X previously described. The waste ammonia liquor is drawn off through the outlet 17 at the bottom of the fixed still.

As has been indicated, the phenol content of this waste ammonia liquor can be greatly reduced if air is blown into the bottom of the fixed still. The air inlet 16 of Fig. 1 is shown at a location just above the level of the liquor in the bottom plate. Three or four such inlets, which may be formed from one-inch pipe, are sufficient for stills of conventional capacity. Air in amounts equal to or greater than about .2 cu. ft. per gallon of ammonia liquor, when introduced in this manner, reduces the phenol content from original values in excess of 200 p. p. m. to a figure less than 20 p. p. m.

Air may be blown into the fixed still through the waste effluent outlet 17 of Fig. 1 with a considerable reduction in phenol content of the waste liquor. Original phenol contents up to about 400 p. p. m. may be reduced in this way to values between about 20 and 40 p. p. m. Our invention may be practiced by blowing the air into the lime leg of the ammonia still rather than the fixed still as previously mentioned. This air may be introduced through the drain 9 of the lime leg, as illustrated in Fig. 1, or through other openings disposed in the bottom of this part of the still. Our invention may be also carried out by blowing air into the bottom of the free still through the outlet 5 of Fig. 1, for example, or other air inlets properly located. However, phenol removal is not desirable here if a phenol recovery system is to be connected between the free still and the lime leg, and in any case the liquor in the free still is normally unlimed.

Best results are obtained when lime is added in amounts sufficient or more than sufficient to displace substantially all the ammonia from the ammonium chloride, ammonium sulfate and other salts present; in other words, the amount of lime for maximum phenol removal is substantially the same as for maximum ammonia recovery. For this reason we prefer to introduce the air into the bottom of the fixed still, preferably above the liquor level of the lowest plate as first mentioned. This level is called the liquor seal.

The removal of phenols by air according to our invention is favored by conditions which improve the contact between air and the liquor treated, and by high temperatures. Both of these are found in the ammonia still, in which bubble caps are employed to cause intimate intermixing of vapor and liquor, and which of course operates at the boiling temperature of the liquor treated. In addition, lime treatment, which we find highly desirable for phenol removal, is also effected in the lime leg of ammonia stills as previously mentioned. At no other point in the by-product coke plant are all these favorable conditions found together, so that the ammonia still is seen to be peculiarly adapted to the practice of our invention.

Our invention is not, however, restricted to ammonia stills. Our process may be carried out, although perhaps less conveniently, in auxiliary apparatus if desired. Such apparatus may, for example, take the form of a large pipe mounted vertically and open at both ends. Air is blown upwardly through the bottom of the pipe and the hot limed ammonia liquor or other phenol-contaminated liquid is sprayed into the top of the pipe, the falling droplets coming in contact with the upwardly moving air. If the ratio of air to liquor in this embodiment of our invention equals or exceeds about one cubic foot per gallon, a phenol concentration as high as 800 p. p. m. may be reduced to a figure as low as perhaps 20 p. p. m.

We prefer to use air in the practice of our invention for reasons of economy but other oxidizing gases, such as oxygen, oxygen-enriched air or mixtures of oxygen and other inert gases, may be employed with success.

Although we have described and illustrated a present preferred embodiment of our invention, it will be understood that our invention is not limited thereto but may be otherwise embodied or practiced within the scope of our claims.

We claim:

1. The process of purifying phenol-contaminated ammonia liquor comprising heating the liquor, treating it with lime, and passing a free oxygen-containing gas through and in contact with the hot limed alkaline liquor, the temperature of the liquor and the quantity of lime present during the introduction of said gas being substantially that obtaining in a fixed ammonia still.

2. The process of purifying phenol-contaminated ammonia liquor in a by-product ammonia still comprising treating the liquor with lime, steam-distilling the limed alkaline liquor, and passing air through and in contact with the hot limed alkaline liquor.

3. The process of purifying phenol-contaminated ammonia liquor in a by-product ammonia still having at least a lime leg and a fixed still including a plurality of vertically stacked sections, each of which is partially filled with ammonia liquor, comprising treating the liquor with an aqueous slurry of lime in the lime leg, transferring the limed liquor to the fixed still, introducing steam into the bottom of the still to steam-distill the limed liquor, and introducing air into a bottom section of the still above the level of the ammonia liquor in this section.

4. The process of purifying phenol-contaminated ammonia liquor in a by-product ammonia still having at least a lime leg and a fixed still including a plurality of vertically stacked sections, each of which is partially filled with ammonia liquor, comprising treating the liquor with an aqueous slurry of lime in the lime leg, transferring the limed liquor to the fixed still, introducing steam into the bottom of the still to steam-distill the limed liquor, and introducing air into a bottom section of the still below the level of the ammonia liquor in this section.

5. The process of purifying phenol-contaminated ammonia liquor in a by-product ammonia still having at least a lime leg comprising treating therein the liquor with an aqueous slurry of lime, introducing steam to heat and agitate the limed liquor, and introducing air into the bottom of the lime leg.

6. The process of purifying phenol-contaminated ammonia liquor in a by-product ammonia still having at least a lime leg and a fixed still including a plurality of vertically stacked sections, each of which is partially filled with ammonia liquor, comprising treating the liquor in the lime leg with an aqueous slurry of lime in amount sufficient to displace substantially all the ammonia from the ammonium salts contained in the liquor, transferring the limed liquor to the fixed still, introducing steam into the bottom of the still to steam-distill the limed liquor, and introducing air into a bottom section of the still above the level of the ammonia liquor in this section in amount not substantially less than about two-tenths cubic foot per gallon of ammonia liquor treated.

FORREST L. McINTIRE.
DAN P. MANKA.

References Cited in the file of this patent

UNITED STATES PATENTS

| Number | Name | Date |
|---|---|---|
| 1,566,796 | Heffner | Dec. 22, 1925 |
| 1,840,977 | Rose | Jan. 12, 1932 |
| 1,902,550 | Forrest | Mar. 21, 1933 |
| 1,957,295 | Shaw | May 1, 1934 |
| 2,088,817 | Shoeld | Aug. 3, 1937 |
| 2,161,772 | Carswell | June 6, 1939 |
| 2,210,542 | Byrns | Aug. 6, 1940 |

FOREIGN PATENTS

| Number | Country | Date |
|---|---|---|
| 451,180 | Great Britain | July 30, 1936 |
| 457,139 | Great Britain | Nov. 23, 1936 |

OTHER REFERENCES

Fowler et al., "Experiments on the bacterial purification of ammonia recovery liquor at the gas works of the Manchester Corporation," Journal of the Society of Chemical Industry, vol. 30, No. 4, pages 180–184 (Feb. 29, 1911).

Lucas, "Organic Chemistry," American Book Company, New York, 1935, pages 414–415.